United States Patent [19]
Wurtenberg

[11] 3,873,286
[45] Mar. 25, 1975

[54] GAS FILTER ASSEMBLY

[76] Inventor: Oscar A. Wurtenberg, 4224 Dolphin Rd., Louisville, Ky. 40220

[22] Filed: June 20, 1973

[21] Appl. No.: 371,900

[52] U.S. Cl................ 55/378, 24/137 R, 55/483, 55/502, 55/509, 55/DIG. 12
[51] Int. Cl.............................. B01d 46/02
[58] Field of Search............ 55/341, 361, 474, 376, 55/378, 381, 481, 482, 483, 484, 500, 502, 509, DIG. 2, DIG. 12; 210/323, 346, 435, 451, 452; 24/67 R, 67.5, 67.9, 137 R, 243 R, 248 R

[56] References Cited
UNITED STATES PATENTS

| | | | |
|---|---|---|---|
| 1,496,666 | 6/1924 | Fatscher | 55/341 X |
| 2,080,154 | 5/1937 | Strindberg | 55/500 |
| 2,418,371 | 4/1947 | Smellie | 55/DIG. 2 |
| 3,026,967 | 3/1962 | Stevens et al. | 55/521 X |
| 3,058,279 | 10/1962 | Metcalfe | 55/495 |
| 3,217,472 | 11/1965 | Babbitt et al. | 55/529 X |
| 3,246,456 | 4/1966 | Sharp | 55/481 |
| 3,247,652 | 4/1966 | Annas et al. | 55/481 |
| 3,422,602 | 1/1969 | Janson | 210/493 |
| 3,568,412 | 3/1971 | Schwab | 55/376 |
| 3,593,502 | 7/1971 | Pelosi, Jr. | 285/242 X |
| 3,691,596 | 9/1972 | Ulansey | 24/137 R |

FOREIGN PATENTS OR APPLICATIONS 1,203,760  9/1970  United Kingdom................. 55/361

OTHER PUBLICATIONS

AAF Arrestall, Dust Control Bulletin 287A, American Air Filter Company, Inc., 215 Central Avenue, Louisville, Ky. 40208, Received in Patent Office 10-16-68, 4 pages.

Cambridge Side-Flo and Side-Cap Side Servicing Air Filters, Bulletin 180C, Cambridge Filter Corporation, 7645 Seventh North Road, Syracuse, N.Y. 13201, Received in Patent Office 7-10-67, 8 pages.

Primary Examiner—Bernard Nozick
Attorney, Agent, or Firm—William E. Sherwood

[57] ABSTRACT

A gas filter bag for mounting in a duct comprises an inexpensive collar attached to and surrounding the open mouth of the bag and held in place by means of clips attachable to the collar and to adjacent bag collars and to the wall of a cell frame.

2 Claims, 8 Drawing Figures

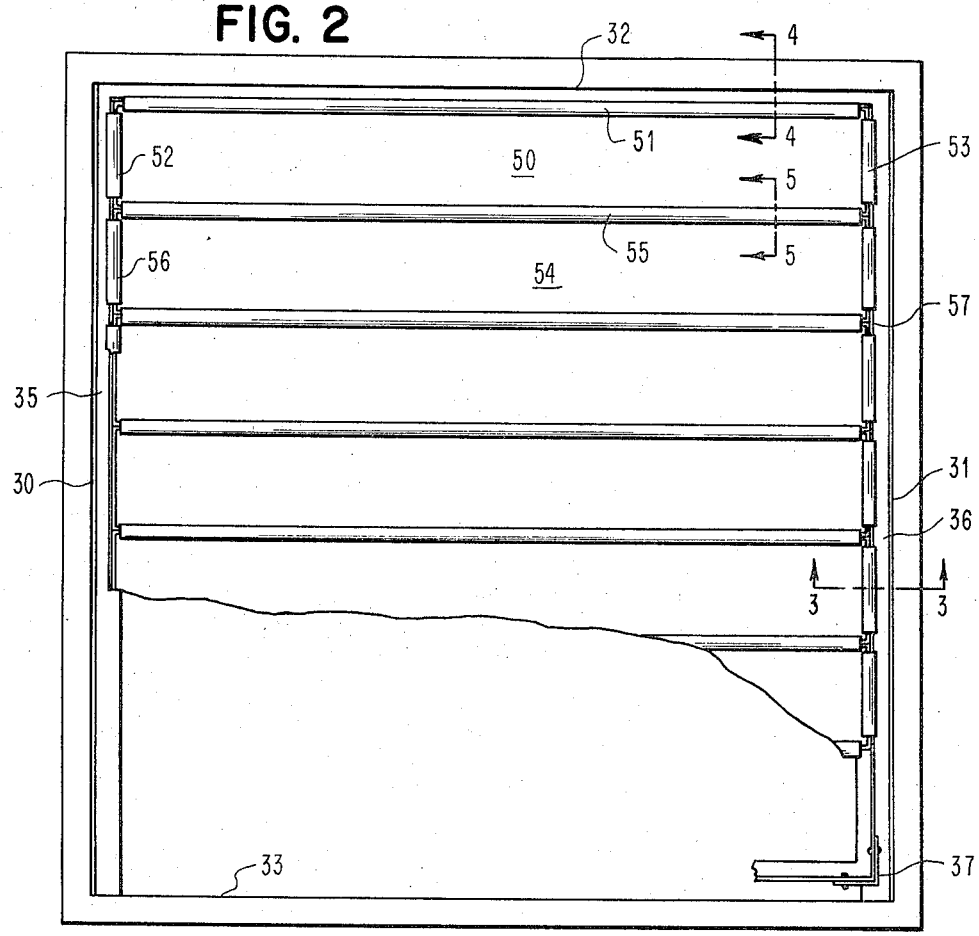
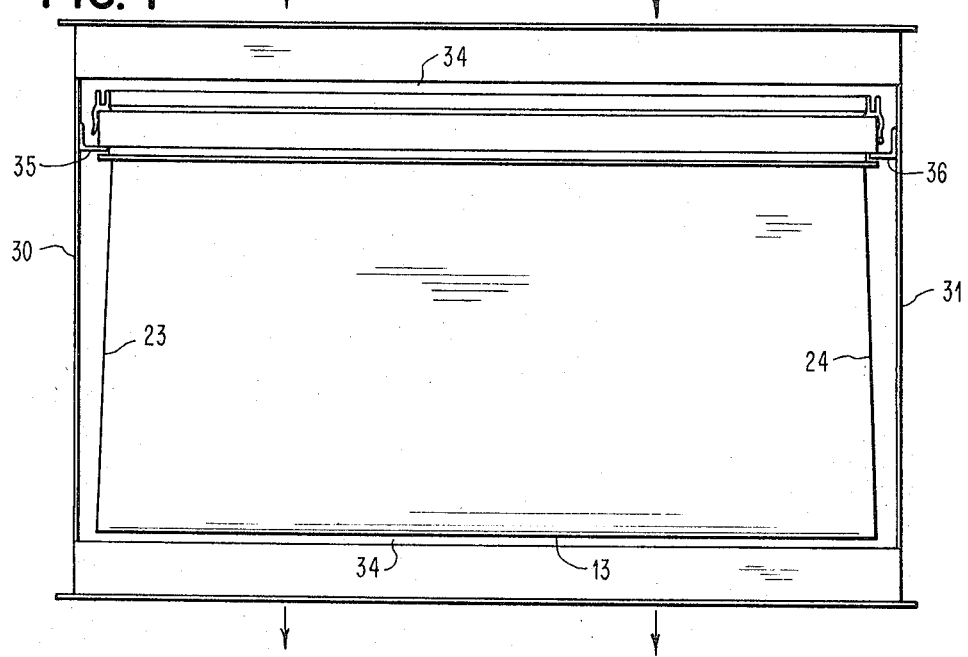

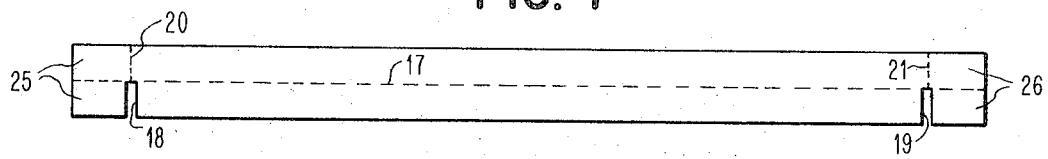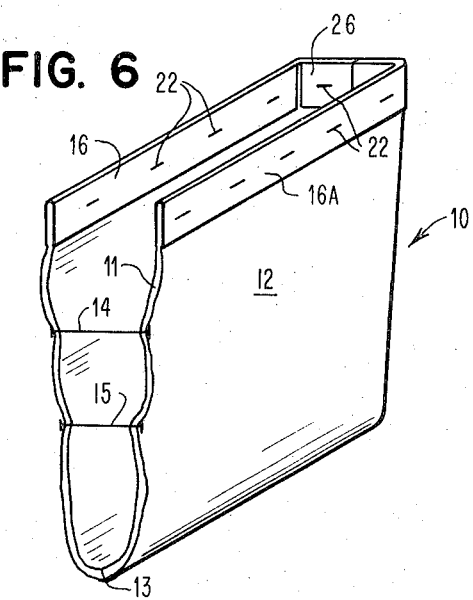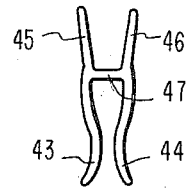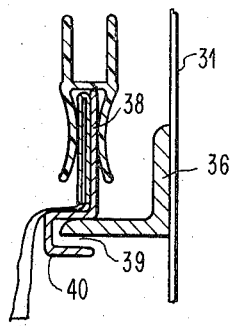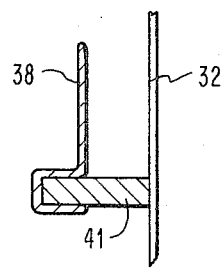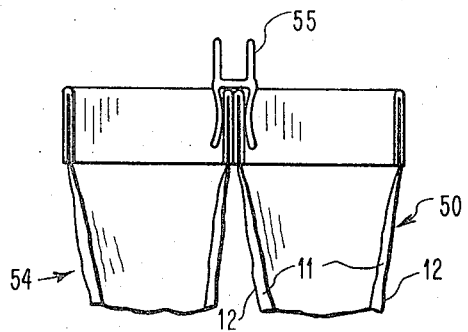

GAS FILTER ASSEMBLY

BACKGROUND OF THE INVENTION

Heating and air conditioning systems as used in domestic installations usually employ dust filters of the glass fiber throwaway type which are rectangular in shape and are from 1 to 2 inches in thickness, but in some installations where removal of pollen and airborne bacteria is required, a more elaborate and expensive electrostatic filter is used. The present invention relates to the use of an improved bag type filter of the medium efficiency range suited for such domestic installations and which while providing an improved filtering action will be comparable in maintenance costs with the low efficiency filter and much less than the cost of the high efficiency electrostatic equipment.

To achieve this cost comparison it is necessary to provide a bag which can be manufactured without high labor and material costs. Moreover, the bag must be suited for ready attachment in sealed relation to adjoining bags and this in turn requires a collar member at the open mouth of the bag. Various prior U.S. Pat. Nos. such as Kulzer 3,475,884, Wiegel et al. 3,537,241 and Getzin et al. 3,541,767 disclose means for holding the mouths of an array of bags in operative position, but involve a more expensive construction with greater obstruction to air flow and with a more laborious installation procedure than required with the present collar construction.

Among the objects of the invention are the provision of an improved gas filter bag of medium efficiency having a simple collar construction of relatively low cost; the provision of a gas filter having a plurality of bags with their collars clamped to a surrounding flow-through cell frame and to the collars of adjoining bags; the provision of a bag having a collapsible collar which when clamped at its ends will provide a rigid rectangular open mouth for the bag; the provision of a bag which may be manufactured inexpensively without depending upon the use of adhesive sealing; and the provision of an improved flow-through cell frame for use in combination with an array of gas filter bags and with a duct in which the filter is installed.

These and other objects and advantages of the invention will become apparent as the description proceeds and when considered in conjunction with the accompanying drawings in which FIG. 1 is a side elevation view of the filter installed in a duct and with the duct access aperture being open, the flow direction being indicated by arrows.

FIG. 2 is a plan view, with portions broken away, of the filter installed in the duct.

FIG. 3 is a sectional view to a larger scale of the cell frame with a bag collar clipped thereto and taken on line 3—3 of FIG. 2.

FIG. 4 is a view taken on line 4—4 of FIG. 2 and showing a seal carried by the cell frame.

FIG. 5 is a view taken on line 5—5 of FIG. 2 and showing the affixing of collars of adjacent bags.

FIG. 6 is a perspective view showing the bag in readiness for assembly upon the cell frame.

FIG. 7 is a developed view of the collar prior to affixing of the bag thereto, and FIG. 8 is an end view of a clip prior to attachment to the bag collar as seen in FIGS. 3 and 5.

Referring first to FIGS. 6 and 7, the filter bag 10 comprises a flaccid sheet of conventional material such as glass fiber 11 having a backing scrim sheet 12 and with these sheets being folded upon themselves to provide a downstream fold line 13 and an open mouth at the upstream edges. Conventional flexible swift attachments such as indicated at 14, 15 join the opposite faces of the sheets to limit the billowing of the bag during use and to aid in spacing the bag from adjacent bags during the filtering action. If desired, the scrim sheet may be adhesively bonded to the sheet of filter medium.

As a significant feature, an improved collar is provided in the form of two coacting strips 16, 16A of thin material such as chipboard and which has a suitable thickness, for example about 0.040 inch, to provide the necessary rigidity of the bag mouth when assembled as later to be described. These strips may be suitably treated with fire retardent material. As shown in FIG. 7 each strip is longitudinally scored at its center by a score line 17 permitting 180° bending and is partially cut away with slots at 18, 19 and with score lines 20, 21 extending from the cut away slots to permit 90° bending. During manufacture of the bag, one of these strips is folded over one mouth edge of the filter media and scrim sheet in centered relation and is then affixed as by means of staples 22 after which the other strip is similarly affixed to the opposite mouth edge of the sheets. Thereafter, the side edges of the folded sheets are sewn or otherwise joined to provide closed edges 23, 24 (FIG. 1) for the bag. A convenient method for thus sewing may comprise a surge stitching followed by edge trimming, such as with use of a conventional Union Special sewing machine. With the bag thus fabricated, the end tab portions 25, 26 of the two chipboard strips may then be positioned, as seen in FIG. 6, for mounting of the bag in the frame. Moreover, until such time as the bag is to be erected the flat collar permits the bag to be stored in flat form.

Passing now to FIGS. 1 and 2 a rectangular duct housing section having side walls 30, 31, a rear wall 32 and a front wall 33 with a closable access aperture 34 therein serves as a housing for a plurality of bags of the type described. Secured to side walls 30 and 31 is a pair of elongated tracks 35, 36 along which an improved cell frame is adapted to slide. This frame, which may be of extruded aluminum shaped in rectangular form and joined at one corner by a securing means 37, includes an upstanding wall 38 bent at its lower end to form a re-entrant slot 39 and an under-lying flange 40. A gasket 41 contained within the slot serves to seal the assembly against rear wall 32 of the duct and a similar gasket (not shown) serves to seal the assembly against the door (not shown) which closes the access aperture of that duct. The continuous wall 38 of the assembled cell frame of course seals the assembly to the side walls of the duct with the result that gas flowing in the direction of the arrows has to pass through the filter bags.

In order to mount the improved bags and to complete the sealing a series of long and short clips are provided which as seen in FIG. 8 may comprise an extrusion of polyvinyl chloride cut to proper shape, it being understood that clips formed of other materials may be employed if desired. Each such clip comprises a pair of lower jaws 43, 44, flared at their lower ends to slip easily over the collar strips of the bags, and a pair of manipulable finger portions 45, 46 spaced from each other and adapted to be moved toward each other in order to spread the lower jaws and to flex an intermediate web 47.

In the initial assembly of the filter the cell frame is withdrawn from the duct and the innermost bag 50 (FIG. 2) is dropped into the frame after which the long clip 51 is attached to wall 38 of the frame and to the innermost long edge of the folded collar of that bag. The bent ends of the collar are then fastened by short clips 52, 53 to the wall 38 of the frame and as will be noted in FIG. 3 the lower edge of the collar is held closely adjacent the upper face of the cell frame.

The next bag 54 is then installed in similar fashion with a long clip 55 engaging the adjacent long edges of the collars of the bags 50 and 54. Short clips 56, 57 are installed for the end tabs of the collar of the second bag and the installation is continued in like manner for all of the bags until the cell frame is filled.

Thereafter, the loaded cell frame is slipped into place on the rails of the duct, the access door is closed and the filter is in readiness for use. Having thus described a typical installation, the advantages of the bag construction will be noted. In addition to the use of inexpensive chipboard for the collar and extruded plastic for the clips, rather than use of metal, no need exists for application of adhesives in order to form and seal the open mouth of the bag. The bag, moreover, is collapsible for storage and transporation and may readily be erected for use without requiring special tools.

While a preferred form of coordinated filtering apparatus has been disclosed it will be understood that the invention may also be embodied in forms other than that exemplified in the preferred form.

I claim:

1. A gas filter assembly of modular construction comprising a rectangular duct having a pair of rails on opposite inner sides thereof, a rectangular cell frame slidable along said rails, said frame comprising a wall bent at one end to form a reentrant slot receiving said rails, a plurality of medium efficiency filter bags disposed within said cell frame and individually removable therefrom for replacement purposes, each of said bags having attached at its mouth a collar comprising a pair of elongated thin chipboard members with a central portion and with end tab portions pivotally connected to said central portion manipulable long clips holding the central portions of each collar member to the adjacent central portion of the next bag of the assembly and manipulable long clips holding the central portion of the collar members of the outermost two bags of the assembly to the adjacent wall of said frame, and manipulable short clips holding the tab portions at the ends of the respective collars of each bag to each other and to said wall of said frame, thereby to provide a modular assembly having a plurality of generally symmetrical rectangular open mouth bags each of which is closely disposed to an adjacent bag and independently removable from said frame.

2. An assembly as defined in claim 1 including a pair of seals disposed in the slot of said cell frame on the two sides thereof unoccupied by said rails.

* * * * *